A. F. ESSLINGER.
SEED TESTER.
APPLICATION FILED MAY 31, 1918.
1,279,310.
Patented Sept. 17, 1918.
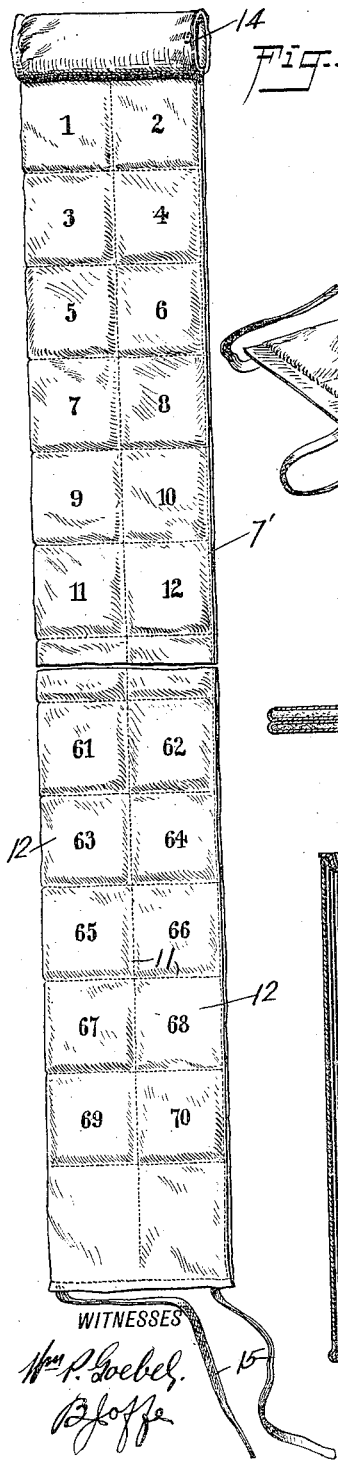
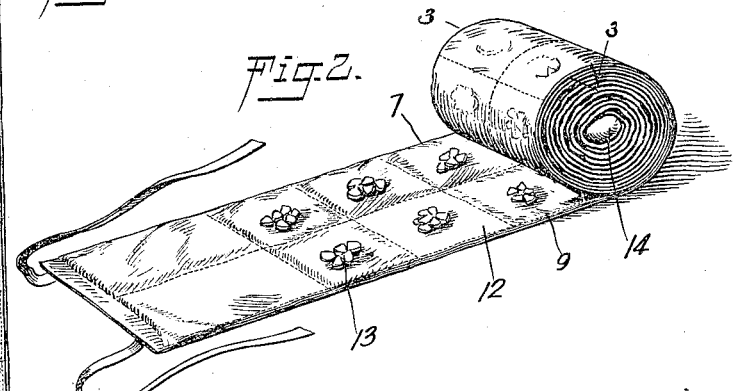
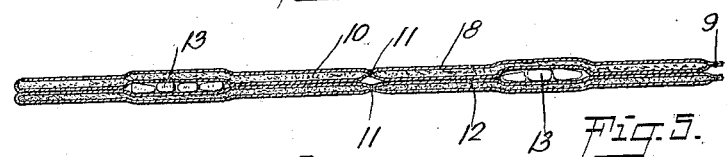
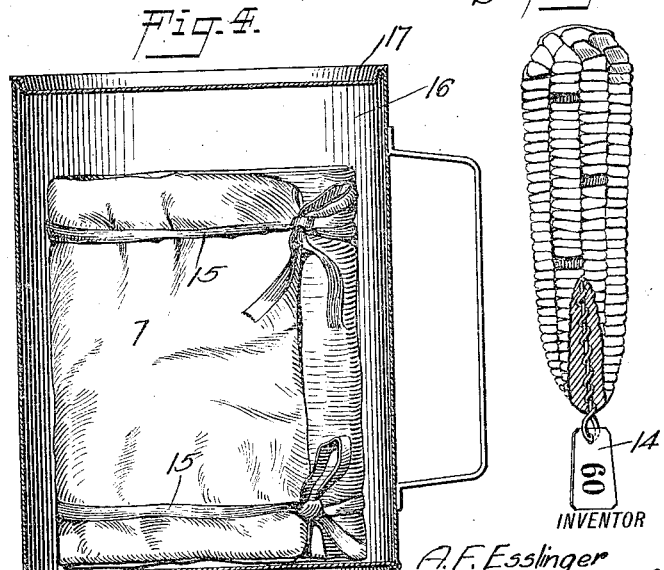
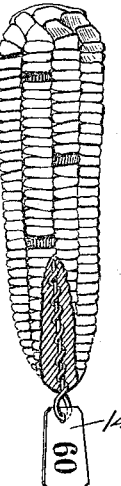
WITNESSES
INVENTOR
A. F. Esslinger
BY
ATTORNEYS

UNITED STATES PATENT OFFICE.

ALBERT FREDERIC ESSLINGER, OF YPSILANTI, MICHIGAN.

SEED-TESTER.

1,279,310.   Specification of Letters Patent.   Patented Sept. 17, 1918.

Application filed May 31, 1918. Serial No. 237,463.

*To all whom it may concern:*

Be it known that I, ALBERT F. ESSLINGER, a citizen of the United States, residing at Ypsilanti, in the county of Washtenaw and State of Michigan, have invented a new and Improved Seed-Tester, of which the following is a full, clear, and exact description.

My invention relates to seed testers and an object of same is to provide a simple, convenient and inexpensive contrivance for testing seed.

Another object of the invention is to provide a device of the character described which is of comparatively small bulk and which will allow a single test of a large number of seeds.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a perspective view of a seed tester which is adapted to carry the seeds which are to be tested for their germinating qualities;

Fig. 2 is a perspective view showing the manner in which the seeds are inclosed in the tester;

Fig. 3 is a transverse section on line 3—3, Fig. 2;

Fig. 4 is the container in which the pad containing the seeds is rolled; and

Fig. 5 is an ear of corn, partly in section, showing the manner in which it is marked to be identified with the seeds that have been taken off the ear and placed into the pad to be tested for germination.

Referring to the drawings, the tester 7 is an elongated flexible member of suitable length and width, depending on the number of ears of corn that are to be tested at one time. As shown, seventy ears of corn can be tested as to the germinating power of the seed. The tester 7 comprises an envelop 8, preferably formed by folding longitudinally the outer member and stitching it at one of the longitudinal edges, as shown at 9 in Fig. 3. This envelop 8 infolds a pad 10 of material which absorbs and retains moisture for a period of time sufficient to cause germination of seeds. The envelop is stitched longitudinally and transversely, as shown at 11, to form sections 12, each of which is preferably numbered for identification purposes. This stitching also locks the pad within the envelop.

Each of the sections 12 is adapted to receive a number of kernels of corn 13 (see Fig. 2 and Fig. 3). When the seeds are removed from the ear of corn the ear is marked by means of a tag 14 carrying the same number as the section or square on which the seeds are placed, as shown best in Fig. 5. Preferably the tag carries a member which can be forced into the cob to anchor the tag to same. Before placing the seeds the pad is moistened by sprinkling or dipping it. When placing the seeds on to the squares or sections 12 the elongated member is extended or unrolled.

The seeds are spaced on the squares 12 in a manner as previously stated, beginning with the first transverse rows. The first row, beginning at one end of the elongated member, is preferably thereat provided with a cushion 14 which has a core also forming a pad adapted to retain moisture. The cushion may form an integral part of the member 7 or it may be secured thereto. This central core containing moisture is rolled along the member 7 as the seeds or kernels are placed in the squares 12, thereby winding the elongated member forming the tester with the seeds. The other end of the elongated member forming the tester is provided with tapes 15 by means of which the wound-up tester can be prevented from unwinding and, therefore, the seeds prevented from moving on the elongated member after the same has been wound in the manner as described.

To reduce the evaporation of the moisture contained in the wound-up tester, the same is, preferably, placed in a suitable container 16, which has a tight cover 17 rendering the same nearly air tight, and in which the wound-up tester is stored for a period of five or six days, during which time the seeds will show whether they have germinating properties or not. When the tester is removed from the container, it is carefully unrolled, care being taken not to displace the seeds on the squares or sections 12. The tester, as well as the pad embodied therein, is made of flexible material, which renders the same very soft, so that the enrolled seeds have plenty of room to expand while germinating.

I claim:

1. A seed tester comprising an elongated member forming an envelop, a pad within said envelop, means securing the envelop to the pad and subdividing said elongated member into a number of sections or squares, a core adapted to retain moisture secured to one end of said elongated member, the elongated member being adapted to be wound about said core, and means at the other end of said elongated member for retaining the same in the wound position about the core.

2. A seed tester comprsing a core adapted to retain moisture, an elongated member secured with one end to said core so as to be wound on said core, said elongated member being in the shape of an envelop, a pad in said envelop of material adapted to retain moisture, means securing the pad to the envelop so as to divide said elongated member into sections, identification means on each of said sections, and means associated with the other end of the elongated member for maintaining the same in the wound position on the core.

ALBERT FREDERIC ESSLINGER.

Copies of this patent may be obtained for five cents each, by addressing the "Commissioner of Patents, Washington, D. C."